United States Patent [19]
Dekel

[11] Patent Number: 5,933,068
[45] Date of Patent: *Aug. 3, 1999

[54] PROTECTIVE APPARATUS FOR AN ELECTRICAL INSTALLATION HAVING TEMPERATURE-SENSITIVE DISCONNECTION MEANS

[76] Inventor: Aram Dekel, 11 Sha'ar Yishuv, Ramot B', Jerusalem, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/677,375

[22] Filed: Jul. 5, 1996

[51] Int. Cl.⁶ .............................. H01H 37/00; H02H 5/04
[52] U.S. Cl. ................................. 337/3; 337/13; 337/85; 361/103
[58] Field of Search ........................... 337/66, 68, 91, 337/31, 111, 349, 379, 380, 3, 13, 85; 361/42, 46, 103, 105, 106

[56] References Cited

U.S. PATENT DOCUMENTS

| | | | |
|---|---|---|---|
| 4,105,986 | 8/1978 | Gogniat et al. | 337/3 |
| 4,334,541 | 6/1982 | Leist et al. | 600/358 |
| 4,500,862 | 2/1985 | Shedd | 337/32 |
| 4,563,667 | 1/1986 | Hofsass | 337/349 |
| 4,901,060 | 2/1990 | Liu | 340/598 |
| 5,233,162 | 8/1993 | Von Gaisberg et al. | 219/265 |
| 5,248,954 | 9/1993 | Chiang | 337/66 |

*Primary Examiner*—Leo P. Picard
*Assistant Examiner*—Jayprakash N. Gandhi
*Attorney, Agent, or Firm*—Edwin D. Schindler

[57] ABSTRACT

A protective apparatus for an electrical installation, includes a device for connecting the protective apparatus to an electrical installation in parallel intermediate phase and zero and under no current and temperature-sensitive disconnection element for disconnecting the electrical circuit when a predetermined temperature for the electrical circuit is attained. The temperature-sensitive disconnection element, preferably, operates the actuating a leakage relay when the predetermined temperature is reached.

3 Claims, 1 Drawing Sheet

FIG. 4
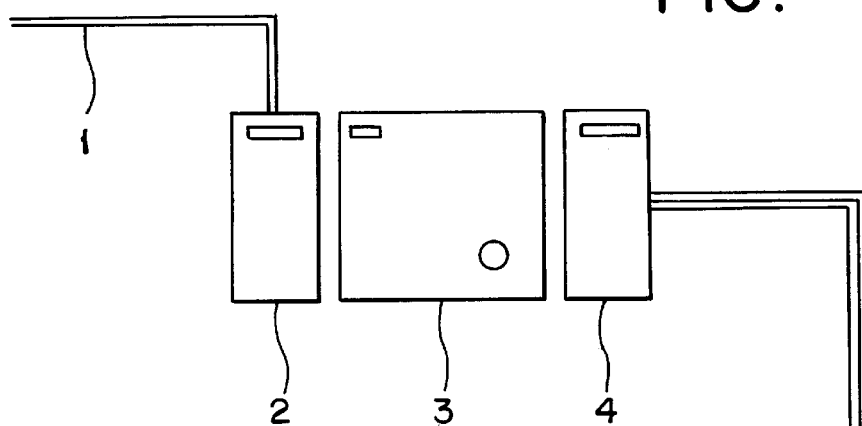
FIG. 1
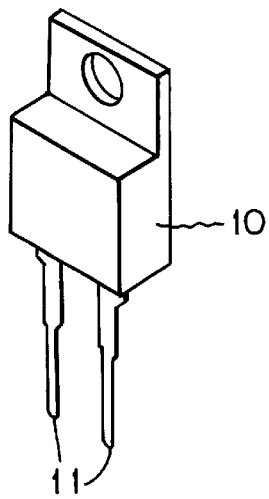
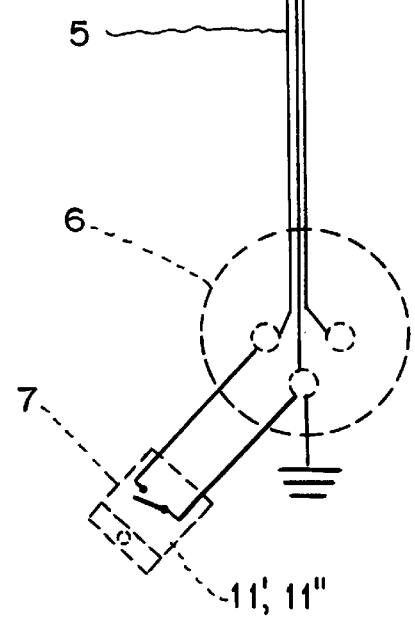
FIG. 2    FIG. 3
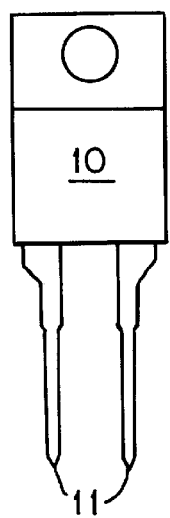    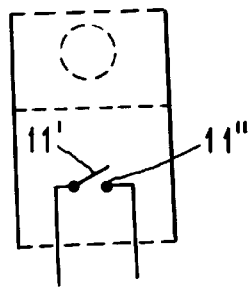

PROTECTIVE APPARATUS FOR AN ELECTRICAL INSTALLATION HAVING TEMPERATURE-SENSITIVE DISCONNECTION MEANS

FIELD AND BACKGROUND OF INVENTION

The present invention relates to a protective arrangement for inclusion in an electric installation system, especially the new arrangement is designed to prevent the cause of fire or damage to the installation due to the sudden electrical failure or rise of temperature in the vicinity of the assembly of integers constituting the arrangement.

The existing protective means designed for inclusion in conventional electric installations are targeted to prevent harm to humanity by electricitation. The conventional means do not consider at all the likelihood of damage to goods and/or premises caused by a short and likely thereby caused spark, or rise of temperature. The heating up of electric wires is a common phenomenon and the consequences are well known and need no further elaboration.

The new protective arrangement construction is based on the recognition that harm could be prevented if, whenever the temperature rises within or at the vicinity of the new protective means, the new means would be actuated and disconnects the whole circuit from the grid.

SCOPE OF INVENTION

This object, according to the invention is obtained by inclusion into a constitutive portion of the respective electric system, a new component which is assigned to short circuiting between "phase" and "zero" or "earth" whenever the temperature rises to a predetermined level.

According to the invention the new arrangement, relates to component such as bimetallic make and break or thermic fuse or switch and the like members of generally known type destined for different purposes.

Such a device could be included e.g. into a wall socket by fixedly connecting its two terminals to the "earth" and "zero" or "zero" and "phase" or "phase and earth" etc., terminals of such a wall socket.

It is also within the scope of the invention to include said component or device within the electric plug.

As stated above a large number of components could be used for utilizing the invention in the following description, reference is made by example to a bi-metallic made and break device.

SHORT DESCRIPTION OF DRAWINGS

The invention will now be described in detail with reference to the accompanying drawings thereof FIG. 1 is a schematic, perspective view of a conventional bimetallic make—and break device.

FIG. 2 being a frontal view thereof.

FIG. 3 illustrates in a schematical manner the function of the device of FIGS. 1 and 2.

FIG. 4 illustrates diagramatically by way of example an electric installation comprising a socket in which the new means is inserted.

DESCRIPTION OF PREFERRED EMBODIMENT

Turning first to FIG. 1 and 2 the generally know bimetallic make and break device comprises a box shaped casing 10 from which extend two terminal wires 11. As shown in FIG. 3 the casing includes two terminals 11' and 11" of metals of different heat expansion coefficient. At normal flow of current terminals 11' and 11" are distant from each other, i.e. the contact if "open". At rise of temperature in whatever part of the system the terminals 11' and 11" snap towards each other: the contact is closed.

In the example of FIG. 4 the outlay of an electric installation is shown, comprising a main conduit 1 leading from the respective grid and feeding the systems which includes a main switch 2, making or breaking contact via a leakage relay 3 with a consumer switch 4 and a consumer line 5 leading to an electric implement, e.g. a wall socket 6. Into the latter is inserted the bimetallic component 7 of FIG. 3 comprising the terminals 11' and 11". Terminals 11' and 11" are connected according to the example to the "earth" and "zero" terminals of wall socket 6 respectively.

At normal flow of current there is no contact between "earth" and "zero" terminals of sockets 6 in case—however—of a rise of temperature at socket 6 the bimetallic implement 10 establishes a short circuit 11' —11" actuation the leakage relay 3, i.e. the whole consumer installation, from the main line 1.

It is quite obvious that the device could be installed also between any other two terminals.

Those skilled in the art will see that in every system comprising a leakage relay intermediate a main line from the grid and a consumer line can be protected by including the new means in whatever consumer outlet.

Whereas by way of examples of use of the new safety means has been described in connection with a wall socket, it is obvious that such a means could equally be included in different implement, e.g. coupler sockets (popularly also called "receptacles") or coupler plugs, lamp housing, and the like.

I claim:

1. A protective apparatus for an electrical installation, comprising:

means for connecting said protective apparatus to an electrical installation in parallel between earth and zero contact terminals, and under no current; and, temperature-sensitive disconnection means including a pair of contact terminals connected to earth and zero contact terminals of the electrical installation, respectively, each of said contact terminals being made of a metal having a different heat expansion coefficient for creating a contact, which when said contact terminals are in an "open" mode allows for a current flow and where said contact closes to a "closed" mode when a predetermined temperature for an electrical circuit is attained, said "closed" mode resulting from the different heat expansion coefficients for each of said contact terminals, thereby creating a short-circuit for discontinuing the current flow and disconnecting the electrical circuit.

2. The protective apparatus for an electrical installation according to claim 1, wherein said temperature-sensitive disconnection means includes a thermic switch.

3. The protective apparatus for an electrical installation according to claim 1, wherein said electrical installation is a wall socket and the wall socket includes zero and phase terminals which are connected to said pair of contact terminals of said means for connecting said protective apparatus.

* * * * *